Sept. 29, 1931.    W. A. BRUNO    1,825,142
MOTION PICTURE FILM MAGAZINE
Filed April 9, 1929
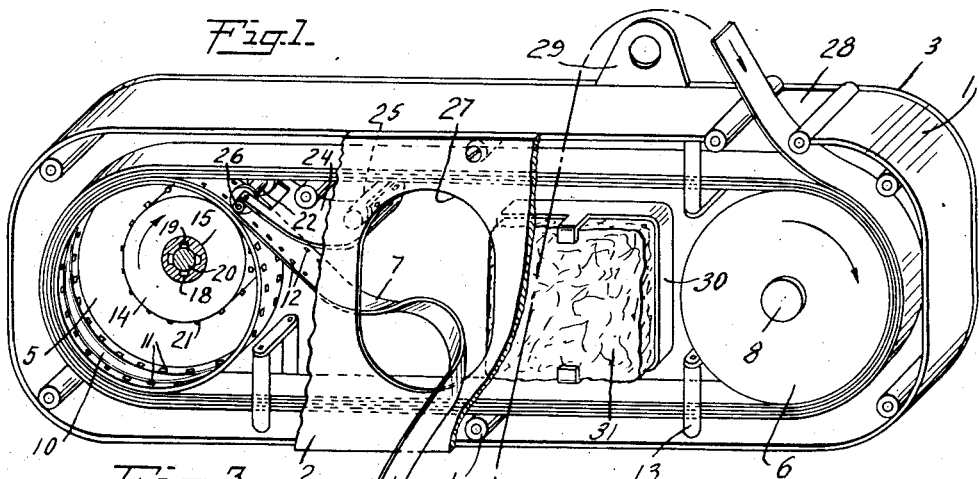
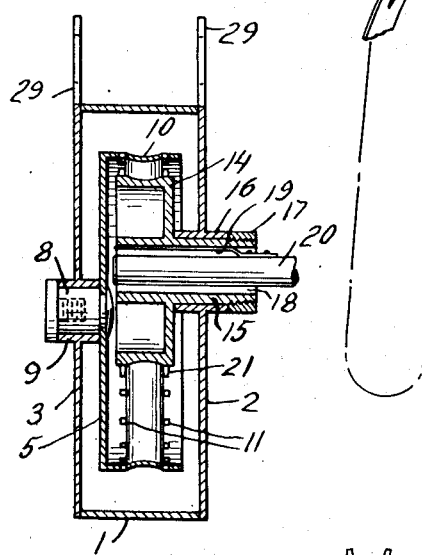
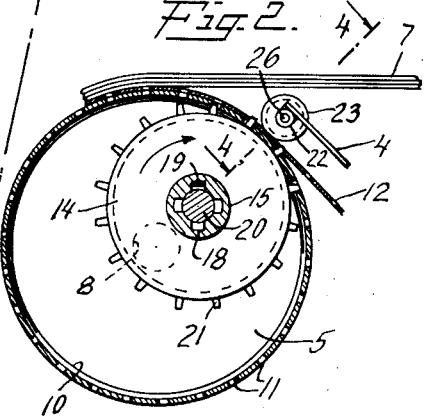
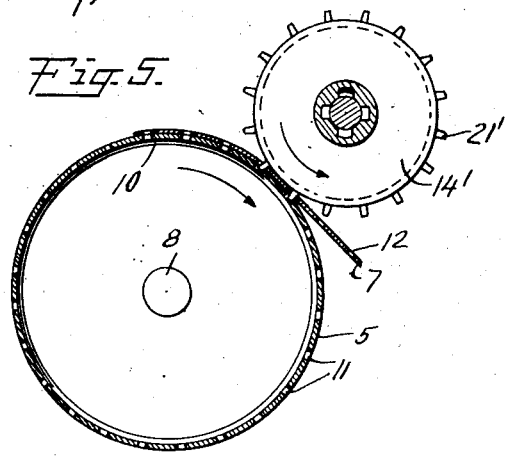
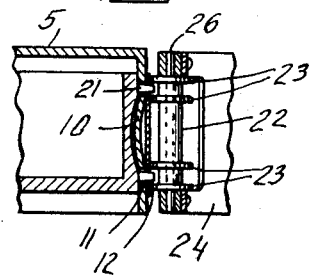
INVENTOR
William A. Bruno
BY
Pennie, Davis, Marvin & Edmonds
HIS ATTORNEYS Patented Sept. 29, 1931

1,825,142

UNITED STATES PATENT OFFICE

WILLIAM A. BRUNO, OF ASTORIA, NEW YORK, ASSIGNOR TO CLARENCE W. FULLER, OF YONKERS, NEW YORK

MOTION PICTURE FILM MAGAZINE

Application filed April 9, 1929. Serial No. 353,811.

This invention relates to improvements in motion picture film magazines, and more particularly to improvements in film magazines used in conjunction with projectors employed for the continuous projection of motion pictures.

It has been found that in the continuous projection of motion pictures where an endless film is employed, a number of problems are present which are not encountered in the construction and operation of ordinary motion picture machines. In the ordinary projection machine, the film is not run through the machine repeatedly, and accordingly, it is not necessary to return the film from the projector proper to the film reel system in such a manner that it may be immediately passed through the projector again without rewinding. With a continuous projection machine, however, it is necessary to employ an endless film and this film must be handled in such a manner that it can be passed through the projector repeatedly without the attention of the operator. Films subjected to such continuous use must be handled with great care by the operating mechanism in order to avoid breakage or other injury, and precautions must be taken to insure the efficient operation of the film magazine mechanism at all times.

In order to prevent rupture or kinking of the film, it has been found that film must be propelled from the reels or other film carrying means to the projecting device by power. This propulsion has been heretofore accomplished by providing sprocket projections or teeth on one or more small rollers, which teeth engage the openings along the edges of the layer of film adjacent the surface of the roller, and applying driving power to such roller. This procedure is unsatisfactory for several reasons. In order to avoid subjecting the film to sharp bends, the film propelling sprocket rollers must be of considerable diameter, and consequently a considerable length of film is in engagement with the surfaces thereof. Motion picture film shrinks considerably upon aging, and thus even though the teeth on the film propelling roller may properly register with the film openings when the film is new, the subsequent shrinkage of the film over the length thereof in engagement with the roller surface is sufficient to upset this registry, and the propelling teeth consequently bend and tear the edges of the film.

Another difficulty encountered in connection with known types of film magazines arises from the contact between the central or image bearing portions of the film and the surfaces of the propelling and supporting reels. In most constructions, only one of the film engaging reels or rollers of the mechanism is power driven, and hence rotation is necessarily imparted to the other or idler reels through the film itself. Thus there is some slippage between the inner layer of the film and the idler reels particularly when the machine is started or stopped, and this slippage causes abrasions on the film surface which mar or obscure the projected image.

With the above and other considerations in mind, it is proposed in accordance with the present invention to provide a film magazine construction for use in connection with continuously operating projecting machines wherein the film propelling sprocket teeth are always in proper registry with the film openings regardless of film shrinkage, and wherein the bending or rupture of superimposed layers of film by the propelling teeth is entirely avoided. It is further proposed in accordance with the invention to provide a novel type of film carrying and propelling reel which is arranged to prevent contact between the reel surfaces and the central or image carrying portions of the film whereby the abrasion of such portions of the film is avoided.

Various other specific objects, advantages and characteristic features of the invention will become apparent as the description thereof progresses.

The film magazine of the present invention preferably includes a plurality of film carrying reels of considerable diameter, whereby the film is carried through the magazine without any sharp bends therein. These reels are constructed to engage the film near its marginal edges only, the cylindrical surfaces of the reels being concave or otherwise centrally disposed to prevent contact thereof with the central portions of the film. My improved film propelling means preferably comprises a power driven toothed roller or drum of considerably smaller diameter than the film carrying reels, the teeth of this drum being arranged to project through spaced openings in the cylindrical surface of one of the film carrying reels and to engage a few adjacent pairs of openings in a single layer of film, whereby both the film and the carrying reel are propelled and the film is positively expelled from the magazine. The power driven drum may be located either within or outside of the film carrying reel. When the propelling drum is located within the film reel, the teeth on the drum project outwardly through the spaced openings in the reel, and the film is maintained in engagement with the teeth by a roller located outside of the reel, the cylindrical surface of such roller being constructed to engage the film near its edges only. The improved film magazine may be detachably secured to any suitable projecting machine and a detachable driving connection is preferably provided between the toothed propelling drum and a suitable driven shaft on the projector.

The present invention comprises an improvement over the construction disclosed in my copending application, Serial No. 282,232, filed June 1, 1928.

In describing the invention in detail, reference will be made to the accompanying drawings; in which Figure 1 is a perspective view of one embodiment of the invention with a portion of one cover plate of the magazine removed;

Fig. 2 is an enlarged side elevation of the film propelling means employed in the embodiment shown in Fig. 1;

Fig. 3 is a sectional view of the magazine showing the propelling means;

Fig. 4 is a partial section taken along the line 4—4 of Fig. 2, and viewed in direction of the arrows; and Fig. 5 is a side elevation of a modified form of film propelling means constructed in accordance with the invention.

The embodiment of the invention shown in Fig. 1 includes a magazine casing 1 having a rear cover plate 3 and a front cover plate 2, the cover plates being secured to the side wall by screws or like means engaging the cross pieces 4. The magazine casing contains a pair of film reels 5 and 6 which carry a continuous loop of film 7. The reels 5 and 6 are preferably carried by stub shafts 8 which are journaled in suitable bearings 9 carried by the rear cover plate 3, although other suitable means for rotatably supporting the reels may be provided. The cylindrical surfaces of the film reels 5 and 6 are preferably centrally depressed as shown at 10, this being conveniently accomplished by forming the cylindrical surfaces of concave section. The cylindrical surface of the reel 5 is provided with a plurality of pairs of perforations or openings 11, these openings being spaced to register with the usual openings 12 provided near the lateral edges of the film 7. The reel 5 is preferably of cup shape construction, as shown in Fig. 3, the front face thereof being entirely open for the reception of the film propelling drum, as hereinafter described.

A plurality of pairs of rollers 13, arranged at substantially right angles to the path of travel of the film 7 in the magazine casing, serve to guide the film.

A receptacle 30, fastened to the inside of the rear cover plate 3 and conveniently located within the area enclosed by the loop of film 7 passing around the reels 5 and 6, is used for the purpose of holding any suitable humidifying medium 31.

Referring now to the film propelling means, a propelling drum 14 of appreciably smaller diameter than that of the film reel 5 is rotatably mounted within this reel on an axis parallel to but lightly removed from the axis of the reel. The drum 14 may be conveniently provided with an integral hollow shaft 15 journaled in a bearing 16 carried by the front cover plate 2 of the film magazine casing, and a sleeve 17 may be threaded on the shaft 15 to limit the endwise motion of the drum. The shaft 15 is preferably provided with a plurality of grooves or keyways 18 for the reception of a spring key 19 carried by a drive shaft 20, the drive shaft being suitably connected to power driven means on the projector or other mechanism in connection with which the film magazine is employed.

The cylindrical surface of the propelling drum 14 is preferably of concave section to fit the concave cylindrical surface of the reel 5, as shown in Fig. 4, and is provided with a plurality of pairs of sprocket teeth 21, these teeth being spaced to register with the perforations 11 in the reel 5 and the perforations 12 in the film 7. The cylindrical surface of the drum 14 bears against the cylindrical surface of the reel 5, and the teeth 21 on the drum protrude through the openings 11 in the reel and the openings 12 in the film. In this manner, driving power is supplied to the reel 5 and the film 7 in such a manner that only two or three pairs of teeth 21 are simultaneously engaged with the film. The film 7 is maintained in engagement with the cylindrical surface of the reel 5 and with the sprocket teeth 21 by means of a roller 22 having peripheral extensions 23 which engage the film 7 on either of the openings 12 therein, as most clearly shown in Fig. 4. The roller 22 is preferably carried by leaf spring 24 fixed to a stud 25 on the rear cover plate 3, the free end of the spring 24 being bifurcated and secured to the shaft 26 of the roller 22.

In the operation of the above described embodiment of my invention, the continuous loop of film 7 is passed through a rounded opening 27 in the front cover plate 2 of the magazine and is wound on the reels 5 and 6 in the manner shown, the front cover plate 2 with the propelling drum 14 being removed for this purpose. The front cover plate 2 is then replaced, the sprocket teeth 21 on the drum 14 being passed through the openings 11 in the cylindrical surface of the reel 5 and through the openings 12 in the single layer of film which passes beneath the roller 22. The return end of the film loop is passed through the opening 28 in the casing 1 as shown. The magazine is then attached to a suitable motion picture projector by the lugs 29 or other suitable means, a power driven shaft 20 of the projector being inserted in the shaft 15 of the propelling drum 14 and keyed thereto by the spring key 19. The drum 14 is then rotated in the direction indicated by the arrow, and the film 7 is then positively expelled from the magazine through the opening 27, whereupon it passes through the projecting machine and returns to the magazine through the opening 28.

In a modified form of the invention shown in Fig. 5, the propelling drum 14' is located outside of the film reel, the sprocket teeth 21' thereon passing first through the openings 12 in the film 7 and then through the openings 11 in the cylindrical surface of the film reel 5. When this embodiment of the invention is employed, the film engaging roller need not be provided.

It is to be understood that my invention is not confined to the particular embodiments illustrated and described but includes such modifications thereof as fall within the scope of the appended claims. For example, the film propelling means disclosed may be employed in connection with many forms of film reels other than those shown, and various other changes or omissions may be made without departing from the scope of the invention.

I claim:

1. In a machine of the type described, a film reel having a plurality of spaced openings on the cylindrical film carrying surface thereof, at least one layer of film lying in contact with the cylindrical surface of said reel a propelling drum of appreciably smaller diameter than said reel mounted adjacent said reel on an axis parallel to the axis of said reel, and a plurality of sprocket teeth projecting from the cylindrical surface of said drum for simultaneously engaging the openings in said reel and spaced openings in the film said sprocket teeth being so spaced that not more than two circumferentially adjacent teeth simultaneously engage said film.

2. In a machine of the type described, a film reel having a plurality of spaced openings on the cylindrical film carrying surface thereof, a propelling drum of appreciably smaller diameter than said reel mounted within the cylindrical surface of said reel on an axis parallel to the axis of said reel, and a plurality of sprocket teeth on said drum for simultaneously engaging the openings in said reel and spaced openings in the film carried by said reel.

3. In a machine of the type described, a film reel having a plurality of spaced openings on the cylindrical film carrying surface thereof, a propelling drum of appreciably smaller diameter than said reel mounted within said reel on an axis parallel to the axis of said reel, a plurality of sprocket teeth on said drum projecting through said openings in said cylindrical surface of said reel and through spaced openings in the film, and means mounted outside of said reel for maintaining the film in engagement with said teeth.

4. In a machine of the type described, a film reel having a plurality of spaced openings on the cylindrical film carrying surface thereof, a propelling drum of appreciably smaller diameter than said reel mounted within said reel on an axis parallel to the axis of said reel, a plurality of sprocket teeth on said drum projecting through said openings in the cylindrical surface of said reel and through spaced openings in the film, and a spring pressed roller mounted adjacent the cylindrical surface of said drum for maintaining the film in engagement with said teeth.

5. In a machine of the type described, a film reel for carrying at least one layer of film of the type having spaced perforations adjacent its edges, said reel having a plurality of openings in the cylindrical surface thereof spaced to register with the openings in said film, a film propelling drum of appreciably smaller diameter than said reel mounted within said reel on an axis parallel to the axis of said reel, a plurality of sprocket teeth on said drum projecting through said openings in the cylindrical surface of said drum and through the openings in the film on said drum and a roller mounted outside of said reel having peripheral extensions on the cylindrical surface thereof engaging the film adjacent the openings therein, whereby the film is maintained in engagement with said sprocket teeth.

6. In a machine of the type described, a film reel for carrying at least one layer of film of the type having spaced perforations adjacent its edges, said reel having a plurality of openings in the cylindrical surface thereof spaced to register with the openings in said film, a film propelling drum of appreciably smaller diameter than said reel mounted within said reel on an axis parallel to the axis of said reel, a plurality of sprocket teeth on said drum projecting through said openings in the cylindrical surface of said reel and through the openings in the film on said reel and means for engaging the outer surface of the film and holding the film in engagement with said sprocket teeth.

7. In a machine of the type described, a film reel for carrying at least one layer of film of the type having spaced perforations adjacent its edges, said reel having a plurality of openings in the cylindrical surface thereof spaced to register with the openings in said film, a film propelling drum of appreciably smaller diameter than said reel mounted within said reel on an axis parallel to the axis of said reel, a plurality of sprocket teeth on said drum projecting through said openings in the cylindrical surface of said drum and through the openings in the film on said drum and spring pressed means mounted outside of said reel and adjacent the cylindrical surface thereof for holding said film in engagement with said sprocket teeth.

8. In a machine of the type described, a film reel having a film carrying cylindrical surface of concave section, and means for propelling said reel and the film carried thereby comprising a driving drum adjacent said reel provided with means for simultaneously engaging said reel and the film thereon.

9. In a machine of the type described, a film reel having a film carrying cylindrical surface of concave cross section and having a plurality of spaced openings adjacent the edges of said cylindrical surface, and a propelling drum of appreciably smaller diameter than said reel, mounted adjacent said reel and provided with a plurality of sprocket teeth for simultaneously engaging the openings in said reel and spaced openings in the film carried on said reel.

10. In a film feeding device for use in connection with film having spaced perforations adjacent the edges thereof, a film reel having a film carrying cylindrical surface of concave section and having a plurality of spaced openings adjacent the edges of said cylindrical surface, a propelling drum of appreciably smaller diameter than said reel mounted within the cylindrical surface of said reel on an axis parallel to said reel, a plurality of sprocket teeth on said drum projecting through said opening in said reel and through the perforations in said film and a spring pressed roller mounted outside of the cylindrical surface of said reel for maintaining said film in engagement with said sprocket teeth, said roller engaging said film adjacent its edges only.

11. In a machine of the type described, a film reel having a plurality of spaced openings on the cylindrical surface thereof, a plurality of layers of continuous film having spaced openings therein carried by one portion of said cylindrical surface, a single layer of said film extending along a different portion of the cylindrical surface of said reel, a propelling drum of considerably smaller diameter than said reel mounted adjacent the surface of said reel on which said single layer of said film is carried, the axis of said drum being parallel to the axis of said reel, and a plurality of sprocket teeth projecting from the cylindrical surface of said drum for simultaneously engaging the openings in said drum and the openings in said single layer of film.

In testimony whereof I affix my signature.

WILLIAM A. BRUNO.